United States Patent

[11] 3,602,993

[72] Inventor Bernard D. Kenney
Midwest Office Bldg. 6415 Stumph Road, Parma, Ohio 44130
[21] Appl. No. 681,860
[22] Filed Nov. 9, 1967
[45] Patented Sept. 7, 1971

[54] DENTAL DEVICE AND PROCESS USING IT TO MAKE JACKETS AND FIXED BRIDGEWORK
5 Claims, 6 Drawing Figs.

[52] U.S. Cl........................................................ 32/17
[51] Int. Cl........................................................ A61c 9/00
[50] Field of Search............................................ 32/17, 2

[56] References Cited
UNITED STATES PATENTS
3,390,458 7/1968 Lytton........................... 32/17

*Primary Examiner*—Robert Peshock
*Attorney*—Claron N. White

ABSTRACT: A hollow dental device that is cylindrical or of other straight wall configuration, except adjacent at one end, is used with modeling compound to make a coping in the process of making jackets and fixed bridgework. The device is contoured at that end to insure retention within the plaster impression made during the process. This dental device is relatively rigid and very resilient as compared with conventional copper bands.

PATENTED SEP 7 1971 3,602,993

INVENTOR
Bernard D. Kenney
by Claron N. White, Atty

DENTAL DEVICE AND PROCESS USING IT TO MAKE JACKETS AND FIXED BRIDGEWORK

BACKGROUND OF THE INVENTION

1. Field of the Invention

This invention relates to a process of making jackets and fixed bridgework that use a novel dental device with modeling compound to make one of the impressions of a prepared tooth instead of using conventional copper bands and modeling compound to make tooth impressions.

2. Description of the Prior Art

A previous method of making crown and bridges, at least in the early 1950's, is described in a book entitled "Theory and Practice of Crown and Bridge Prosthesis" by Stanley D. Tylman, Third Edition, and published in 1954 by the C. V. Mosby Company, St. Louis Mo. That textbook describes the preparation of the tooth and a method of obtaining impressions of the prepared tooth by the use of two copper ands filled with modeling.

One of these impressions is used to prepare an amalgam die while the other is used to prepare a coping or transfer metal crown. This coping, which is made of a low-fusing metal, is placed on the prepared tooth prior to taking a plaster wash impression of the coping and at least adjacent teeth. After the plaster impression is removed the transfer metal crown is replaced in its correct position within the impression and it is then ready to receive the permanent amalgam die that is made from the other impression using the other copper band filled with modeling. Thereafter, a working model is made from the plaster impression containing the metal crown in the plaster and the amalgam die with its replica of the prepared tooth in the cavity of the metal crown. The working model is used to prepare the jacket.

In the prior process, described above, two accurate impressions are made using copper bands and modeling compound. It is necessary for most dentists to ship them to a laboratory. There one is used to make the coping or transfer metal crown that must be an accurate replica in its cavity of the prepared tooth, otherwise the metal crown will not be accurately positioned on the prepared tooth before making the plaster wash impression. If the coping is not properly positioned on the prepared tooth, the die that is made from the other impression using the copper band and modeling compound, will not be properly oriented with respect to adjacent teeth when making the working model. As a result, the final jacket when mounted on the prepared tooth will be improperly aligned with respect to the other teeth and the bite will not be proper.

In the process of the prior art, it is conventional to have the patient in the office for three visits. During the first visit, the tooth is prepared. Two impressions of the prepared tooth from its distal end to the shoulder are made using two copper bands of the same proper size. These are sent to the laboratory. They are chosen from copper bands of about 20 different sizes as regards outer diameter. The correct size is chosen by slipping a nonfilled copper band over the prepared tooth to insure its clearance inside and out with respect to the prepared tooth and the adjacent teeth, respectively. Also, it is checked relative to the shoulder of the prepared tooth. The clearance internally is a guess because the copper band is not transparent. In both cases, the copper band is necessarily festooned and cut to the contour of the shoulder of the prepared tooth to provide a tight fit against this shoulder of the prepared tooth. To conclude the first visit the patient is fitted with a temporary jacket. A large number of jackets are commercially available. To make the impressions, the bands are filled with modeling compound and then pressed onto the prepared tooth. After the compound has hardened by cooling, the band is removed. The compound in the band provides a cavity counterpart of the surface of the prepared tooth.

Prior to the second visit of the patient, the laboratory makes a coping or transfer metal crown from one of the impressions. At the second visit this crown is placed on the prepared tooth and a plaster wash impression is made. The plaster is hardened and then removed. The coping remains with the prepared tooth. It is removed from the tooth and placed in the plaster impression.

A wax bite has been made before the impression with the plaster wash was made. The wax bite, information of the shade of the teeth and the plaster impression with the transfer crown in place are sent to the laboratory.

At the laboratory this jacket is made by placing the amalgam die in the metal crown that is in the plaster impression to form an assembly that constitutes a working model. On this die thus located, the jacket is made in the conventional manner used by the laboratory technician.

This jacket is placed on and cemented to the prepared tooth as the final step of the process and is done at the third visit.

SUMMARY OF THE INVENTION

This invention relates to a dental device and a process using it in the manufacture of dental jackets and fixed bridgework. The manner of making the bridgework will be obvious to those skilled in the art from the teaching of the invention with respect to the process described below for making a jacket for a single tooth.

The dental device of the invention is a hollow tubular piece that has an outer surface parallel to or converging toward the longitudinal axis of the tube for a major part of its length from one end and has an outer surface configuration that is further removed from the longitudinal axis, for at least a part of the periphery The preferred device is a tube with a major part of its length from one end being cylindrical or frustoconical having its larger diameter at that end and the other part being frustoconical or outwardly flared to an outer surface of larger diameter than the adjacent portion of the major part of the device. This construction permits plaster of the plaster impression during the process to be in front of the rear flared or incisal end of the device mounted on the prepared tooth by the modeling compound in it.

This dental device has a wall and is made of a material so that the sidewall is very resilient and relatively rigid as compared with the sidewall of conventional copper bands used in the prior art process for making dental jackets. The copper bands are cylindrical tubes. They have a wall thickness such as to be readily deformed at the one end to abut the shoulder. They are supplied in different lengths. The dental devices of the present invention are preferably of the same set of sizes. Desirably, they would have the same inner diameter as comparable copper bands but the wall thickness of the two e.g. 0.025 inch and 0.004 inch for the device of the invention and for the copper band, respectively) does not differ enough to preclude the use of the same outer diameters for a set of the dental devices as the copper bands. The lengths will correspond. The choice of the suitable dental device of the invention, for use in the process as described below, determines the choice of suitable copper bands for use in another part of the process. This device of the invention is preferably of a transparent plastic construction.

The invention, as a process for making a jacket or the like for a prepared tooth, comprises: (1) making in modeling compound disposed in a metal band an accurate impression of the entire surface configuration of the prepared part of the tooth; (2) preparing from said modeling compound in the metal band a die having at one end an accurate replica of the prepared part of the tooth; (3) forcing a modeling compound disposed in a relatively rigid and resilient hollow dental device against and over the prepared part of the tooth to form in the modeling compound in the dental device a cavity having the configuration corresponding to at least the major length of the prepared part of the tooth; (4) preparing a plaster wash impression of at least adjacent teeth and the dental device and the molding compound in it on the prepared part of the tooth; (5) removing the plaster impression and with it the dental device and the modeling compound in it; and (6) placing the replica portion of the die in the cavity of the modeling compound in the dental device maintained in the plaster impression to form an assembly from which can be obtained a working model containing the die accurately positioned relative to a replica of at least adjacent teeth for the preparation of the jacket or the like from the model.

DETAILED DESCRIPTION

Figure 1:
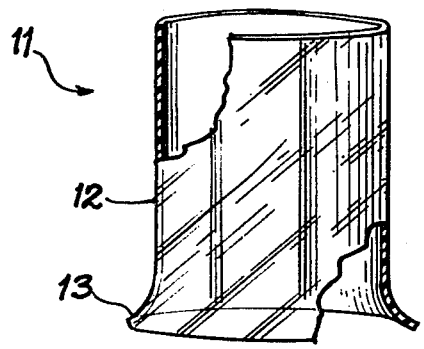
FIG. 1 is a view in elevation, partially broken away, of a preferred embodiment of the dental device of the present invention.

Referring to FIG. 1, this embodiment of the dental device of the invention is generally indicated at 11 and comprises, as one piece, a hollow cylindrical major portion 12 and an outwardly flared hollow portion 13. The hollow dental device 11 is resilient as well as relatively rigid. Thus, not all materials are suitable for its manufacture. The use of a plastic material to make dental device 11 is preferred. However, most plastics of the wall thickness and outer diameter of device 11 are too flexible to be suitable. It is especially preferred that the plastic composition be transparent at the wall thickness of device 11. The dimensions of an illustrative dental device 11 are a nominal outer diameter of one-fourth inch and a wall thickness of 0.025 inch. The dental device 11 of plastic is made by molding using preferably cellulose acetate, such as used in Caulk crown forms sold by L. D. Caulk Co., Milford, Del. Another material is a polycarbonate plastic such as "Lexan" manufactured by General Electric Company.

Figure 2:
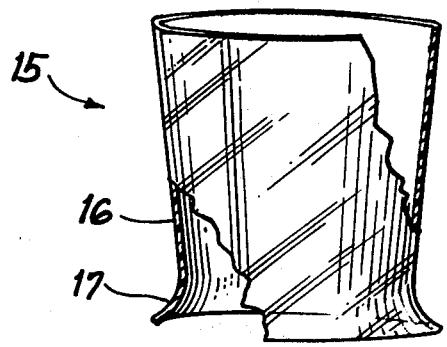
FIG. 2 is a view in elevation, partially broken away, of a second preferred embodiment of the dental device of this invention.

The other preferred embodiment of the dental device of this invention is shown in FIG. 2 where it is generally indicated at 15. The device 15 is of one piece with a major frustoconical portion 16 and another frustoconical portion 17. The ends of frustoconical portions 16 and 17 that have the minimum outer diameters are adjacent to each other. The maximum diameter of frustoconical portion 17 may be smaller than, equal to, or larger than the maximum diameter of portion 16. The general dimensions for dental device 15 are comparable to those of dental device 11 when comparing the member of a set of each that is suitable for use with a specific set of copper bands having conventional diameters. Again, the material of device 15 and the wall thickness are based on considerations mentioned about with respect to dental device 11. The device 15 has the advantage that the distance between device 15 and the prepared tooth can vary less than is the case for device 11.

As seen later in a description of the process of the present invention, dental device 11 has a portion 13 with a configuration to permit plaster being placed behind it. The setting of the plaster provides a rigid material that will remove dental device 11 from a prepared tooth and retain device 11 as part of the plaster impression assembly The same is true with respect to device 15 because plaster will be behind portion 17 in the making of the plaster impression.

As seen in FIGS. 1 and 2, both of these preferred embodiments of the device of the invention are open at both ends.

In the following description, the portion 13 is at the incisal end of the prepared tooth. In using the process with dental device 15, portion 17 is to be considered analogous to portion 13 of dental device 11.

Figure 3:
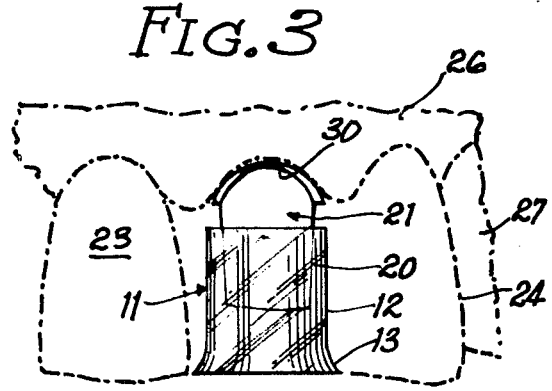
FIG. 3 is a fragmentary front elevation of the upper gum and a prepared upper middle incisor tooth with the unfilled dental device of FIG. 1 positioned over the distal major part of the prepared part of the tooth during the choosing of the correct size of the dental device to be used in the process of this invention and showing in phantom the other middle incisor, the left lateral incisor and the left canine tooth.

From a set of dental devices 11, the dentist chooses one that can be fitted over the major portion of the prepared part 20 of tooth 21 (see FIG. 3) so that dental device 11 is spaced from prepared part 20 throughout its periphery by a desired minimum amount and at the same time dental device 11 is spaced from adjacent teeth 23 and 24. The teeth 21, 23 and 24 extend into upper gum 26 of the patient. The tooth 27 adjacent to tooth 24 is also shown in FIG. 3. Of course, dental device 11 and tooth 27 are spaced from tooth 24 in FIG. 3 which shows teeth in the mouth of a patient. These are not in a straight line but are in an arc and the view is from the convex side.

When the choice has been made as regards the appropriate one of a set of dental devices 11 of different sizes the dentist can then choose a corresponding one of a copper band (not shown) of conventional construction and dimensions from a set of copper bands.

The end of the cylindrical copper band to be adjacent to gum 26 is festooned and cut to fit snugly against prepared tooth 21, for a slight distance below shoulder 30 of tooth 21. The selected copper band is filled with modeling compound and this combination is pressed against tooth 21 until the festooned end of the copper band is beyond shoulder 30 as described above. This is done when the modeling compound is sufficiently softened. After cooling, the modeling compound is sufficiently hard. Then the copper band with its modeling compound having an impression corresponding to prepared portion 21 of tooth 20 has a cavity at the one end is sent to the laboratory for the manufacture of an amalgam die. These procedures of making an accurate impression of the prepared tooth and a die from it are conventional. This die is designated generally at 31 in FIG. 6 and will be referred to later.

Figure 4:
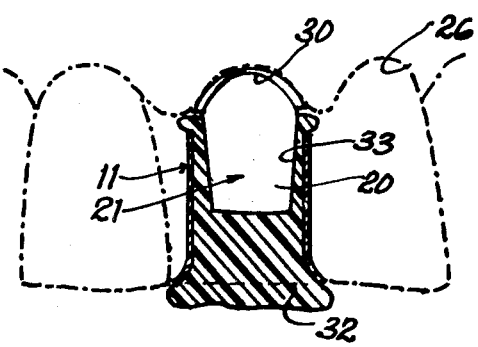
FIG. 4 is a view like FIG. 3 but showing the dental device of FIG. 1 filled with modeling compound, with both in cross section, and applied to a major portion of the prepared part of the middle incisor tooth.

The dental device 11 is filled with a modeling compound 32 and the latter of this assembly is softened by heating in the conventional manner for the modeling compound in the copper band, used as described above. As seen in FIG. 4, the modeling compound 32 in dental device 11 is pressed against prepared portion 20 of tooth 21 until modeling compound 32 surrounds the major part of portion 20. This provides a cavity 33 in modeling compound 32. At the same time, part of compound 32 is displaced from dental device 11 at its ends. When device 11 has been chosen, as described above, it is cut at one end so that its length is desirably less than the length from shoulder 30 to the plane passing through the extremities of teeth 23, 24 and 26. This cut dental device 11 is seen in FIG. 3.

When molding compound 32 in device 11 has been cooled by ambient air sufficiently to harden, the dentist removes device 11 and the compound 32 and returns it to tooth 21 a number of times to be satisfied that the cavity 33 in compound 32 has an accurate impression of the end of prepared portion 20 of tooth 21. If thus satisfied, the dentist puts device 11 and compound 32 back on tooth 21.

Figure 5:
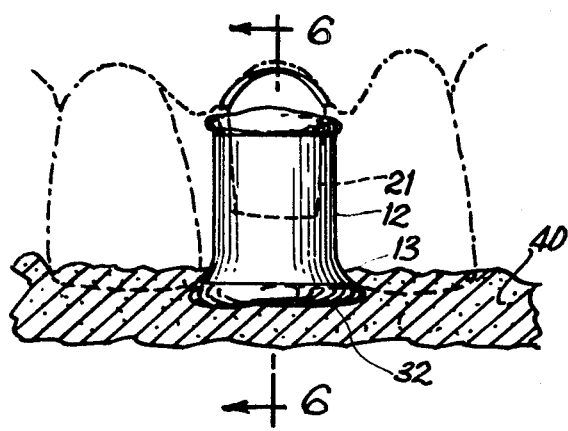
FIG. 5 is a view like FIG. 4 but with a fragmentary cross section of the bottom part of a plaster impression formed thereon by this process.

Then in the conventional manner, a plaster wash impression is made of teeth, 21, 23, 24, 25 and usually all of the other teeth of that set. When the plaster has set, the plaster impression 40 (FIG. 5) is removed from the set of teeth. The dental device 11 and modeling compound 32 are removed automatically with plaster impression 40 by virtue of a portion 41 of plaster impression 40 being behind portion 13 of dental device 11. The term "behind" relates to the relative positions with respect to the direction of movement of plaster impression 40 during its removal from the teeth.

For the preparation of plaster impression 40 it is preferred that a formulation be used that provides very little heat during the setting process. Such a material is sold under the name "-Solvite" distributed by H. J. Bosworth Company, Chicago, Ill. Some heat of reaction for setting could provide some stresses at the location of dental device 11 and compound 32. This would result in a change in the shape of cavity 33 shortly after plaster impression 40 is removed from the teeth part but for the relative rigidity and the resiliency of dental device 11. The dental device insures the formation and retention of an accurate impression in compound 32 of the outer part at least of prepared portion 20 of tooth 21.

Figure 6:
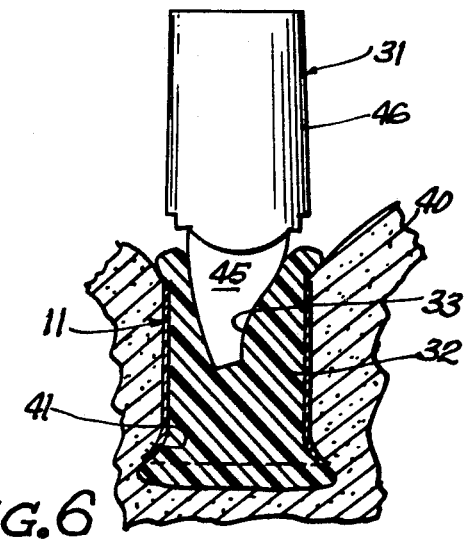
FIG. 6 is a cross-sectional view taken along line 6—6 of FIG. 5 of the plaster impression, after removal from the teeth, with the dental device and modeling compound in it, and showing the die in position.

Referring to FIG. 6, plaster impression 40 is shown with dental device 11 in its top surface layer. The cavity 33 in compound 32 faces upwardly. The die 31 has at one end a portion 45 that is a replica of tooth 21. The portion 45 is inserted into cavity 33 as far as it can be inserted. It is seen that part of portion 45 of die 31 is above compound 32 and dental device 11 as well as above plaster impression 40. This is permissible because the cavity provides sufficient surface configuration corresponding to the outer end of prepared portion 20 of tooth 21 that there will be an exact positioning of die 45 relative to the cavities having surface configurations corresponding to impression of the outer portions of other teeth in the upper set. The die 45 has a conventional upper portion 46 that provides a means of insuring a rigid mounting of die 45 in a working model that includes die 45 and is prepared from the assembly shown in FIG. 6.

The forgoing description of the invention has been presented for purpose of illustration. Many modifications of the article of the invention, namely, the dental device, and many modifications of the process of the invention will be suggested to one of ordinary skill in this art from the foregoing description. For example, the hollow dental device can be cylindrical for its entire length but is provided with ribs adjacent the one end in lieu of the outward flaring of portion 13 of device 11. These ribs of the dental device will be behind part of the plaster of the plaster impression that is made in the process of the present invention to insure the retention of the dental device by the plaster impression when it is removed from the teeth. Accordingly, the invention is limited only by the claims that follow.

I claim:
1. A process for making a jacket or the like which comprises:
   1. making in modeling compound disposed in a metal band an accurate impression of the entire surface configuration of the prepared part of the tooth;
   2. preparing from said modeling compound in the metal band a die having at one end an accurate replica of the prepared part of the tooth;
   3. forcing a modeling compound disposed in a relatively rigid and resilient hollow dental device against and over the prepared part of the tooth to form in the modeling compound in the dental device a cavity having the configuration corresponding to at least the major length of the prepared part of the tooth;
   4. preparing a plaster wash impression of at least adjacent teeth and the dental device and the molding compound in it on the prepared part of the tooth;
   5. removing the plaster impression and with it the dental device and the modeling compound in it; and
   6. placing the replica portion of the die in the cavity of the modeling compound in the dental device maintained in the plaster impression to form an assembly from which can be obtained a working model containing the die accurately positioned relative to a replica of at least adjacent teeth for the preparation of the jacket or the like from the model.

2. The process of claim 1 wherein the hollow dental device has an end portion that is outwardly flared and that end is closer to the proximal end of the prepared tooth when forming a cavity in the modeling compound in the dental device.

3. The process of claim 2 wherein the hollow dental device is a transparent plastic tube.

4. The process of claim 3 wherein the dental device is generally cylindrical from the outwardly flared end portion to the other end.

5. The process of claim 3 wherein the hollow dental device is frustoconical from the outwardly flared end portion to the other end with the larger diameter of the frustoconical shape being adjacent to the outwardly flared end and wherein the dental device is cellulose acetate.